United States Patent [19]

Materne et al.

[11] Patent Number: 5,319,277
[45] Date of Patent: Jun. 7, 1994

[54] ELECTRO-DYNAMIC MACHINE WITH AN INTEGRAL ELECTRICAL SERVICE CIRCUIT

[75] Inventors: Xavier Materne, Billere; Richard Dazat, Chatillon, both of France

[73] Assignee: Valeo Systemes D'Essuyage, Montigny-le-Bretonneux, France

[21] Appl. No.: 986,860

[22] Filed: Dec. 4, 1992

[30] Foreign Application Priority Data

Dec. 6, 1991 [FR] France .................... 91 15163

[51] Int. Cl.$^5$ .................................. H02K 13/00
[52] U.S. Cl. ........................... 310/239; 310/249
[58] Field of Search ............ 310/239, 242, 249, 71, 310/89, 90, 254, 261

[56] References Cited

U.S. PATENT DOCUMENTS

| | | | |
|---|---|---|---|
| 3,760,209 | 9/1973 | Hult | 310/90 |
| 4,673,836 | 6/1987 | Akiyama et al. | 310/239 |
| 4,906,884 | 3/1990 | Teshigawara | 310/268 |
| 5,148,073 | 9/1992 | Tamura | 310/239 |

FOREIGN PATENT DOCUMENTS

| | | | |
|---|---|---|---|
| 0168742 | 1/1986 | European Pat. Off. | 310/239 |
| 0311395 | 10/1988 | European Pat. Off. | 310/239 |
| 0359853 | 3/1990 | European Pat. Off. | 310/239 |
| 9013006 | 7/1991 | Fed. Rep. of Germany | 310/239 |
| 2530885 | 1/1984 | France | 310/239 |
| 2582872 | 12/1986 | France | 310/239 |
| 59-148548 | 12/1984 | Japan | 310/239 |

Primary Examiner—Steven L. Stephan
Assistant Examiner—Matthew Nguyen
Attorney, Agent, or Firm—Morgan & Finnegan

[57] ABSTRACT

An electro-dynamic machine in the form of a d.c. motor having a commutator, has an electrical service circuit carried by a printed circuit on which are mounted brush carriers for the carbon brushes engaged with the commutator. The machine has a casing which is closed by an intermediate member, and the electrical service circuit is mounted within a cavity of the intermediate member defined by a peripheral flange of the latter, this flange being directed towards the interior of the machine when the intermediate member is mounted on the motor casing.

9 Claims, 8 Drawing Sheets

ELECTRO-DYNAMIC MACHINE WITH AN INTEGRAL ELECTRICAL SERVICE CIRCUIT

FIELD OF THE INVENTION

The present invention is concerned with an electro-dynamic machine having armature windings which are connected to a source of electrical supply or to an electric load through an electrical connecting cable.

BACKGROUND OF THE INVENTION

In the prior art, arrangements have been proposed for mounting electrical service circuits on the casing or body of the machine. However, these solutions present certain problems in respect of mounting, especially in relation to the positioning of the components of the machine with respect to the electrical service circuits.

In a currently preferred arrangement, the machine has a commutator which is mounted on a rotor. The latter carries windings; either these have to be excited (where the machine is acting as a motor), or, where the machine is acting as a generator, an induced electromotive force is taken from across the ends of the windings. The electrical connecting cable is connected to carbon blushes mounted in brush carriers and in contact with the conductive strips of the commutator. The relative positioning of these components must be precise, and this involves some manufacturing cost. In general the known ways of mounting the components are not satisfactory.

DISCUSSION OF THE INVENTION

One object of the present invention is to overcome this problem met with in the prior art.

The carbon brushes are liable to progressive wear, and have to be replaced from time to time. In the prior art, it is necessary to reset the precise positioning of the brushes afresh when they are replaced. This operation is often difficult to carry out. Accordingly, another object of the invention is to enable the brushes to be replaced without the need for this resetting operation.

In addressing the above mentioned problems, the present invention is concerned in general terms with an electro-dynamic machine the windings of which are connected to a source of electrical energy, or to a load, by means of an electric connecting cable which is connected to conductive zones of a printed circuit which supports an electrical service circuit, and which is fixed with respect to the casing of the machine.

According to the invention, such a machine is characterised in that the casing is closed by means of an intermediate member, with the electrical surface circuit being mounted in the interior of the intermediate member, inside a cavity or recess which is defined within a peripheral flange directed into the machine when the intermediate member is fitted on to the casing.

A further object of the invention is to provide a machine which includes an intermediate member carrying legs or fastening lugs for the printed circuit on which the electrical service circuit is formed, the latter being adapted to manage the electrical supply for the machine.

Yet another object of the invention is to provide an electro-dynamic machine having a commutator and carbon brushes which include fastening elements for brush carriers provided on the printed circuit.

According to a preferred feature of the invention, the printed circuit of the machine includes an insulating substrate circular in shape and having a central through hole which is adapted to allow the shaft and commutator of the rotor of the machine to pass through it, with the outer periphery of the substrate being formed with locating notches for the brush carrier plate on an intermediate member between the casing and an end plate of an associated mechanism such as a reduction gear unit, these notches being, in particular, formed by circular punching with non-symmetrical angles between them, in such a way that the printed circuit can only be fitted to the motor in one possible orientation.

According to another preferred feature of the invention, the machine includes carbon brush holders which are provided with tongues or studs adapted to penetrate into the corresponding holes of zones of the substrate.

According to yet a further preferred feature of the invention, the machine is such that the intermediate member includes, in particular, two ears which are formed with through holes for attachment to the base plate of the reduction gear unit and the ears of the casing.

According to still another preferred feature of the invention, the machine is such that the intermediate member includes centring pins, the upper portions of which include two projections which are adapted to penetrate into the notches in the substrate, in such a way that the substrate can be installed in an angular position and in abutment on an end surface of each pin.

Further features and advantages of the present invention will be more clearly understood on a reading of the description, which follows, of preferred embodiments of the invention, given by way of example only and with reference to the accompanying drawings.

DESCRIPTION OF PREFERRED EMBODIMENTS OF THE INVENTION

Figure 1:
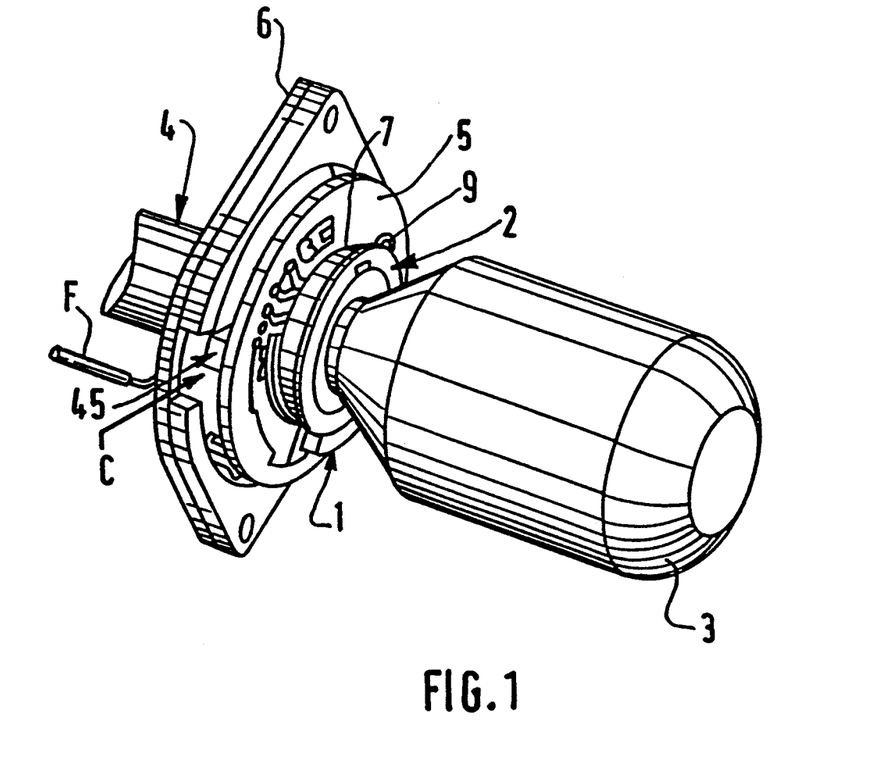
FIG. 1 is a simplified view of the rotor of a machine in accordance with the present invention, mounted on a printed circuit on a base plate of the machine.

FIG. 1 shows, somewhat diagrammatically and in perspective, a rotor mounted in a printed circuit in one embodiment of the present invention. The rotor includes an armature winding 3 and a commutator 7, both of which are mounted on a motor shaft 4.

The commutator 7 passes through a hole which is formed through a printed circuit 5 that supports the electrical service circuit which will be described later on herein. The printed circuit 5 is mounted on support feet (not shown), which are mounted on the inner face of an end plate or intermediate member 6. The latter serves for closing the casing (141 in FIG. 9) of the machine, and to secure it to a support or to another working component such as a speed reducing gearbox.

A wheel 2, on which an angular position indicator 9 is carried, is mounted at one end of the commutator 7. The indication given by the indicator 9 may be obtained in particular, either by inscription of an optically readable mark, or by loading it with an item of magnetic data. In one version, this indication consists of a single indication or mark. A reading device 1, for reading the indication 9 which is inscribed or loaded on the wheel 2, is mounted on the printed circuit 5. The nature of the reading device 1 depends on the nature of the indication (i.e. whether it is magnetic, optical, or of some other form). It will be noted, in particular, that the reading device 1 is carried by the printed circuit 5.

The intermediate member 6 is formed with at least one recess or notch C, through which access is available to at least one brush carrier 45, in particular with a view to replacing the brush without having to modify the relative positioning of the brush carriers 45 with respect to the commutator 7. Finally, the printed circuit 5 includes terminal blocks, not shown, which are described later in this document and which are connected by soldering, in particular to the ends of the wire of an electrical connecting cable F.

In one preferred embodiment of the invention, the indication is magnetic in character. The reading device accordingly comprises a Hall effect sensor, the output voltage of which is modulated as a function of the variations in flux generated by the magnetic indication. It is thus possible to obtain a reading signal at the output of the reading device 1 which has a first value (for example a maximum) when the indication 9 is physically closest to the reading device, and a second value (which may for example be a minimum value) when the indication is remote from the reading device, for example diametrically opposed to it.

Figure 2:
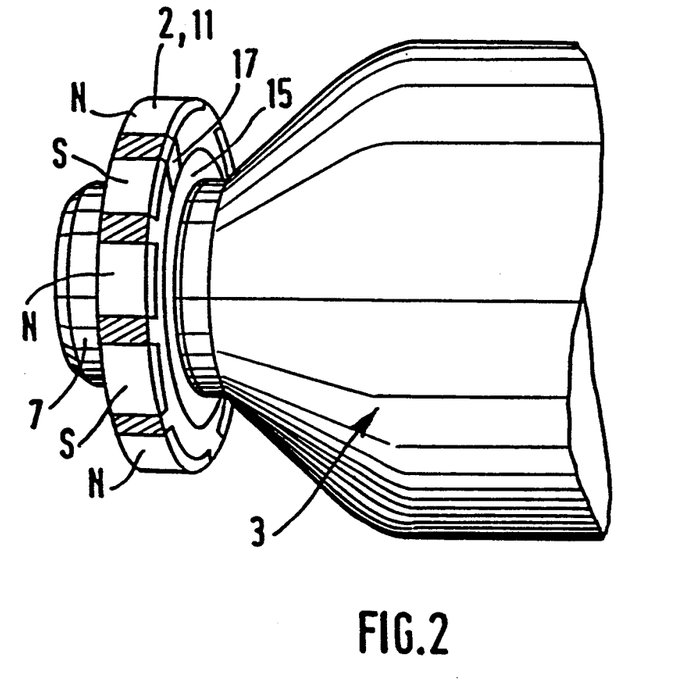
FIG. 2 is a general view of the rotor before being fitted on the printed circuit.

FIG. 2 is a partial perspective view showing a machine in one embodiment of the invention. The wheel 2 comprises a cylindrical ring 11 mounted on a radial spacer 15 and secured against rotation by means of at least one tongue 17. The cylindrical ring carries a succession of magnetic north and south poles, which are either inscribed or inserted, in a known way.

Figure 3:
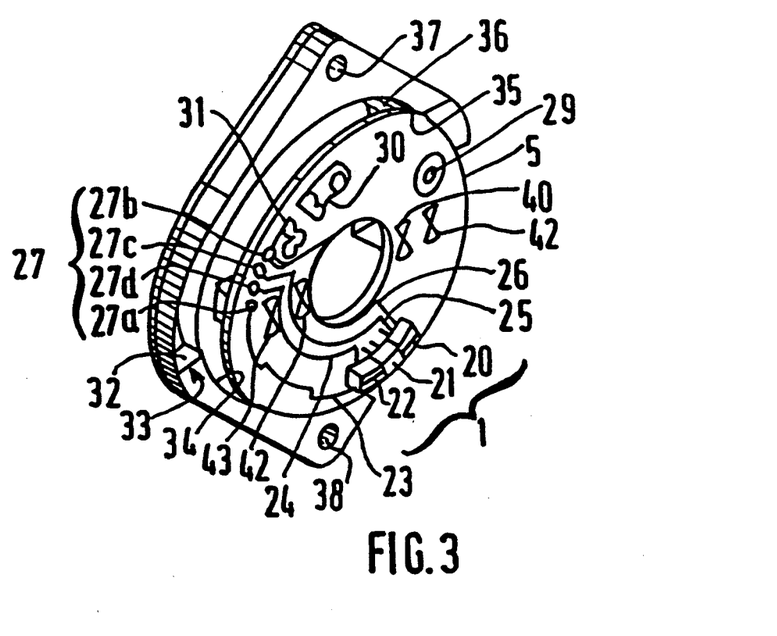
FIG. 3 is a detail of the fastening of a reading device in a machine in accordance with the invention.

FIG. 3 is a view of the intermediate member 6, with the printed circuit 5 attached to it before insertion of the rotor. In the lower part of the Figure, the printed circuit 5 carries the reading device 1. Here this consists of two Hall effect sensors 20 and 22, which are spaced apart by an angular interval which is for example 10 degrees. The two sensors 20 and 22 are inserted in recesses formed in a sensor support member 21, so that they can be secured mechanically and oriented with respect to the rotating part, e.g. the wheel 2, which carries the indication of angular position, such as the magnetic indication or mark as discussed above. Such Hall effect sensors comprise a body made of a semi-conducting material, one face of which must be disposed parallel to the variation in the flux to be detected. This face is of course the Hall effect detection face. Each sensor has three electrical terminal tags, one for positive polarisation, one for negative polarisation (i.e. connected to ground), and one for the detection signal.

The positive terminal tag of each sensor 20, 22 is connected to a contact strip 23 on the printed circuit 5. This strip 23 leads into a conductive zone 27a of the printed circuit 5, on to which a traverse element (not shown) is soldered. The traverse element comprises a suitable elongated conductive body such as a wiping finger. It constitutes an element on to which a corresponding wire of electrical supply cable of the machine can be soldered during assembly of the motor.

Similarly, the negative terminal tag of each sensor is connected to another contact strip 26 on the printed circuit 5. This strip 26 leads into a second conductive zone 27b of the printed circuit 5, on to which a further traverse element (again not shown) is soldered. This traverse element again comprises an elongated conductive body such as a wiping element, and again, during assembly of the motor, a corresponding wire of the electrical supply cable for the machine can be soldered to it.

The third terminal tag, for carrying the detection signal of each of the Hall effect sensors 20, 22, is connected to a respective one of two further conductive strips 24 and 25 of the printed circuit. In one embodiment, these two conductive strips 24 and 25 are connected respectively to conductive zones 27c and 27d respectively on the printed circuit. Further traverse elements, connected to corresponding wires of the power supply cable for the motor, are arranged on these conductive zones 27c and 27d. Accordingly, the machine is able to be controlled and operated from outside, due to the detection signals transmitted by the two Hall effect sensors.

The assembly consisting of the conductive zones 27a, 27b, 27c and 27d, together with the traverse elements mentioned above, constitutes one part of a terminal block 27. In one embodiment, this terminal block is the first part, for example the male part, of a connector. The second part of this connector is fitted on the end of the electrical connecting cable of the machine.

In another embodiment, the printed circuit carries components (not shown in the drawings) which enable the output signals from the sensors 20 and 22 to be processed in the electrical service circuit 5 itself. For example, the service circuit 5 may perform the function of interface between the electronic processing means and the machine.

The electrical supply for the machine is obtained by way of carbon brushes and the connecting cable, which also includes wires for connection to the windings of the machine (not shown). These windings are connected to conductive zones 30 and 31 respectively, to which are soldered the tails (not shown) of the wires in the stator windings—if indeed the stator is a wound stator—and/or the wires for connection to the brushes engaging on the commutator of the machine for supplying the machine.

The intermediate member 6 includes fastening ears through which holes 37 and 38 are formed for fastening the member 6 to a plate of the body or casing (not shown) of the machine. The electric service circuit 5 is mounted in the interior of the intermediate member 6, within a recess which is defined by a peripheral flange 33. This recess is open towards the interior of the machine when the intermediate member is mounted on the casing. The intermediate member 6 carries legs or fastening lugs 34 and 36 for the printed circuit on which the electrical service circuit 5 is formed (see FIG. 4).

Figure 4:
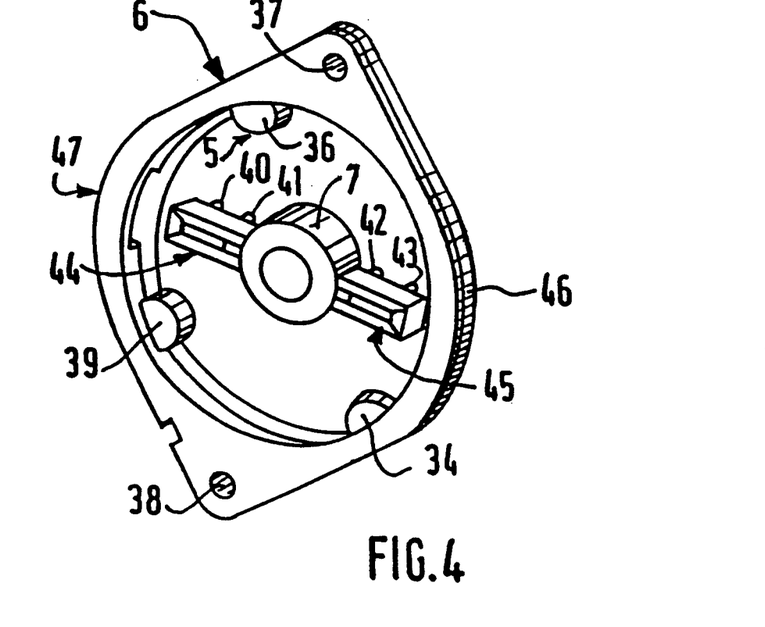
FIG. 4 shows a detail of one component of the machine seen in FIG. 3, which enables an integral machine in accordance with the invention to be made.

FIG. 4 shows a pair of brush holders 44 and 45, having fixing lugs 40, 41 and 42, 43 respectively which are inserted into corresponding holes in the printed circuit 5. These fixing lugs can also be seen on the other side of the printed circuit 5 in FIG. 3, being visible in FIG. 5 on the same side of the circuit 5 as the brush holders 44 and 45. FIG. 6, described below, is also relevant.

In FIG. 4 the same reference numerals are given to the same elements as in the preceding Figures. In FIG. 4 the commutator 7 extends through a hole formed in the printed circuit 5 and a corresponding hole in the base of the intermediate member 6. The latter is here shown as though fitted on to the motor casing, though the latter is not itself shown.

Figure 5:
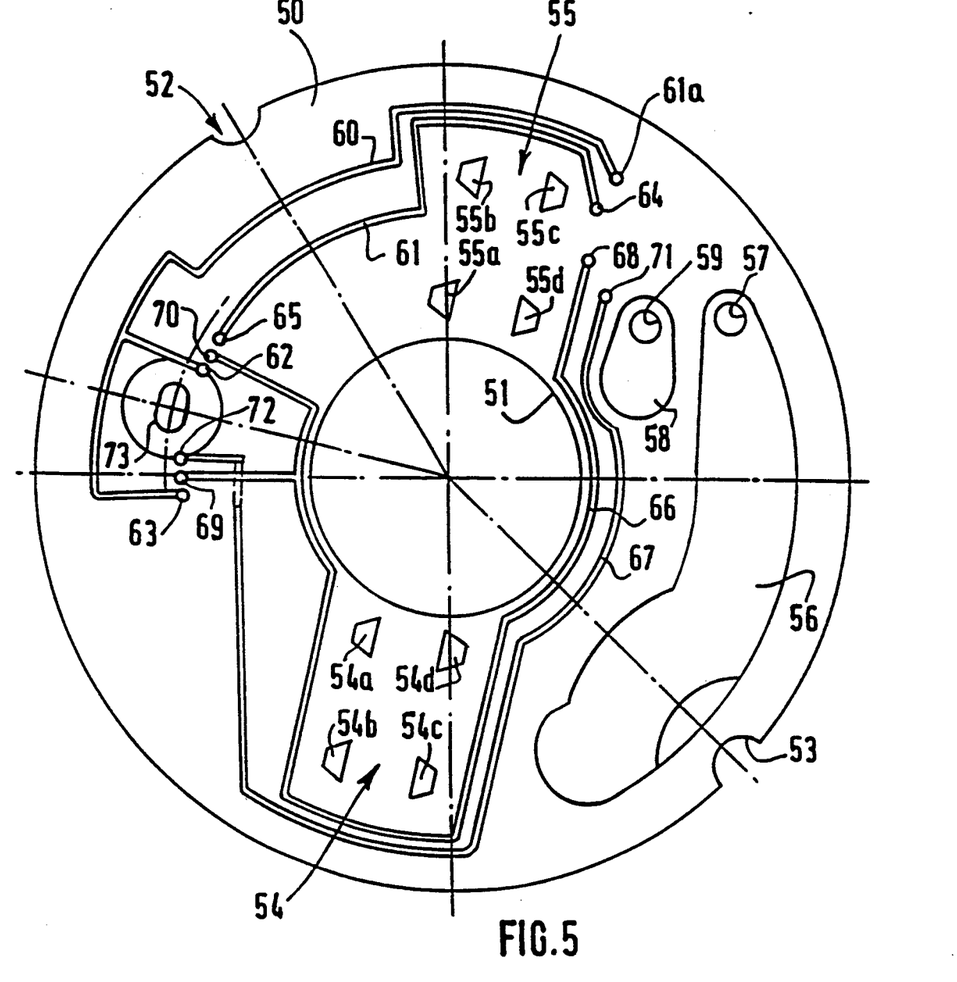
FIG. 5 is a top plan view of one component of the machine shown in FIG. 4.
Figure 6:
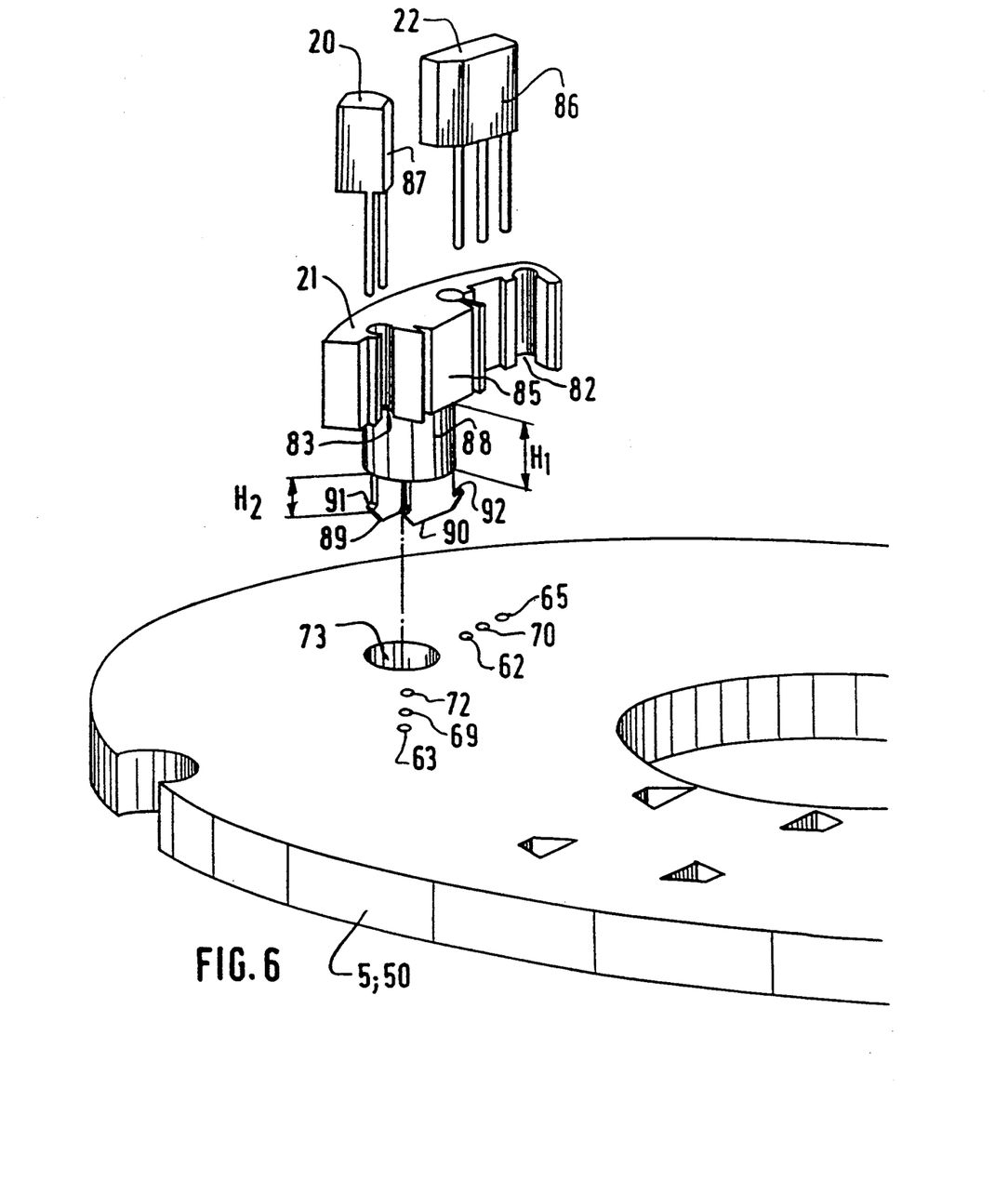
FIG. 6 is an exploded perspective view showing, in one embodiment, the manner in which a reading device in accordance with the invention is mounted on a component such as is shown in FIG. 5.

FIG. 5 shows one embodiment of the printed circuit for attachment to the intermediate member 6 of FIG. 2. The printed circuit comprises an insulating substrate 50, generally circular in shape and having a central through hole 51 through which the shaft and commutator of the rotor are able to pass. The outer periphery of the substrate 50 is formed with two notches 52 and 53 for locating the brush carrier plate on the intermediate member 6. These notches are made using circular punches, and are offset from each other at such an angle that they are not symmetrical, so that during assembly, the printed circuit can be fitted in the motor in only one correct orientation.

In addition, the substrate, or support, 50 has two zones 54 and 55 which are pierced with trapezoidal fastening holes 54a to 54d and 55a to 55d respectively, which are adapted to receive the fixing lugs of the two brush carriers on the face of the printed circuit that is not visible in FIG. 5.

The substrate 50 carries a first conductive zone 56 of the motor power supply circuit. This conductive zone 56 has a through hole 57 through which one connecting pin is able to pass. The substrate 50 also carries a second conductive zone 58 which is arranged to receive a connector for connecting the power circuit to ground. This second conductive zone 58 has a further through hole 59 through which another connecting pin can pass. The conductive zones 56 and 58 correspond to the zones 30 and 31 in FIG. 3, and thus constitute the connecting means for the power supply to the motor.

The substrate 50 also carries a connecting strip 60 for the common connection of the Hall effect sensors to ground, and a further connecting strip 61 for carrying the detection signal from a first one of the Hall effect sensors. The ground connecting strip 60 connects a terminal connecting element 61A to two further terminal connecting elements 62 and 63. The first and second Hall effect sensors (not shown in FIG. 5) have their respective terminal pins for connection to ground engaged with the terminal elements 62 and 63 respectively. The conductive strip 61 is joined to further terminal connecting elements 64 and 65, the signal output pin of the first Hall effect sensor being soldered to the connecting element 65.

The substrate 50 also carries further conductive strips indicated at 66 and 67. The strip 67 supplies the Hall effect sensors with a positive voltage, while the strip 67 conveys the detection signal from the second Hall effect sensor. The strip 66 joins a terminal collecting element 68 to two further terminal collecting elements 69 and 70. The positive terminal pins of the two Hall effect sensors are secured respectively to the elements 69 and 70. As to the connecting strip 67, this joins a terminal collecting element 71 to a terminal collecting element 72 for engagement with the corresponding terminal pin of the second Hall effect sensor. The various terminal collecting elements 61, 64, 69 and 70 together correspond to the terminal block described above with reference to FIG. 3.

An oblong fixing hole 73, in which a fixing lug for the support member (21 in FIG. 3) for the two Hall effect sensors is attached by clipping, is formed in the insulating substrate between the group of terminal connecting elements 65, 70 and 62 for the first sensor, and the corresponding connecting elements 72, 69 and 63 for the second sensor.

Reference will now be made to FIG. 6 which illustrates how the Hall effect sensors are mounted on the printed circuit. Each sensor 20 or 22 is in the form of a capsule in the general form of a parallelepiped, with its three connecting pins projecting from its lower face. These pins penetrate into the holes 65, 70 and 62 for one sensor, and 72, 69 and 63 for the other sensor. As will be realised from the description above with reference to FIG. 5, these holes are the respective terminal connecting elements. Before the pins are inserted into these holes, the two sensors 20 and 22 are introduced in a sliding movement into two housings, 82 and 83 respectively, formed in the sensor support 21. The latter has a central portion 85 which sets the distance between the two sensors 20 and 22 on the one hand, and which also has a curvature whereby the detection face 86 of the sensor 20 is suitably oriented with respect to the corresponding detection face 87 of the sensor 22.

The sensor support member 21 has, in addition, a column portion 88 projecting downwardly from its lower face. The height H1 of this column portion 88 is predetermined according to the final position in which the wheel 2 or 11, and the reading device 1 comprising the sensors 20 and 22, are fitted. The column portion 88 has a lower free end which defines a height H2 that corresponds to the thickness of the printed circuit 5. This lower free end carries two flexible lugs 89 and 90, which are formed with shoulders 91 and 92 respectively, and which together define a foot of the support member 21. This foot is inserted into the hole 73 of the substrate 50, described above with reference to FIG. 5. As the two lugs 89 and 90 are inserted in the hole 73, they are pinched closer together, being released when the shoulders 91 and 92 emerge on the other side of the substrate 50.

Because the hole 73 has an oblong shape (see FIG. 6: in FIG. 7 it is now shown as circular, for simplicity), the sensor support member 21 is fixed as regards its orientation, once it is fitted in the substrate. In addition, during the fitting operation, the fixing lugs of the Hall effect sensors, described earlier herein, are guided naturally through the corresponding contact holes of the substrate 50.

Figure 7:
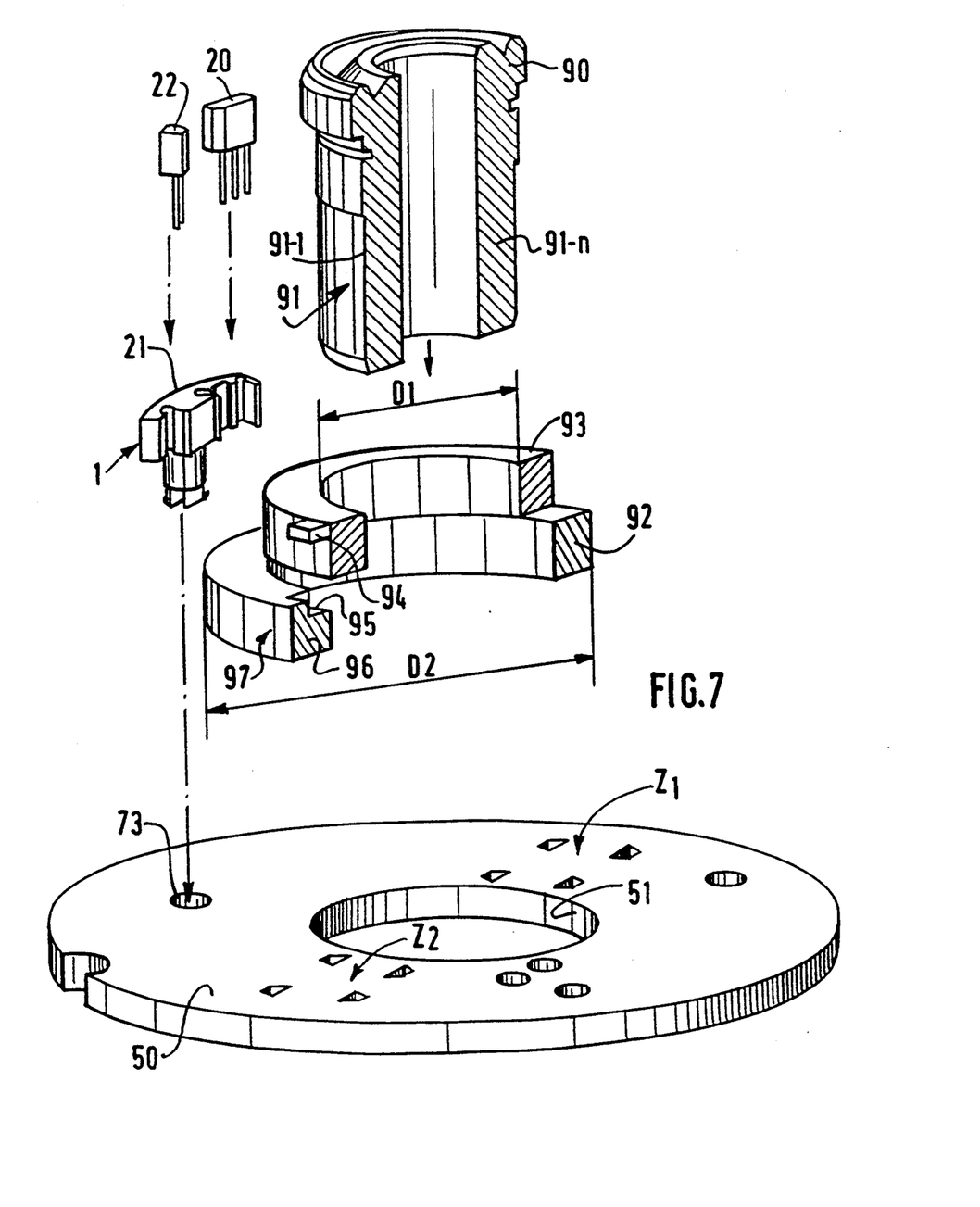
FIG. 7 is a somewhat diagrammatic exploded view showing the principle of a screen wiping apparatus using the machine of the invention.

FIG. 7 shows in more detail an embodiment of the invention. In this Figure, one half of the commutator is shown at 90. This is of course mounted on the motor shaft (not shown). The contact strips 91-1 to 91-n of the commutator are on one portion, having a first diameter D1 such that it will fit snugly in the bore of the multi-polar wheel, shown at 92. The multi-polar wheel comprises a first cylindrical portion 93 which is provided with a stop lug 94. The latter is arranged to come into engagement, during the fitting operation, in a rebate 95 formed in a second cylindrical portion 96 of the multipolar wheel.

The multi-polar wheel has an external diameter D2 such as to bring its magnetised zones 97 close to the Hall effect sensors 20 and 22 once the latter have been fitted in the sensor support member 21, the latter having been fitted to the substrate 50. In this arrangement, the multi-polar wheel 92 rests on the upper surface of the substrate 50, while the commutator 90 extends downwardly into the bore 51 of the substrate so as to lie between the zones Z1 and Z2 of the latter in which the brush carriers (not shown in FIG. 7) are situated.

Figure 8:
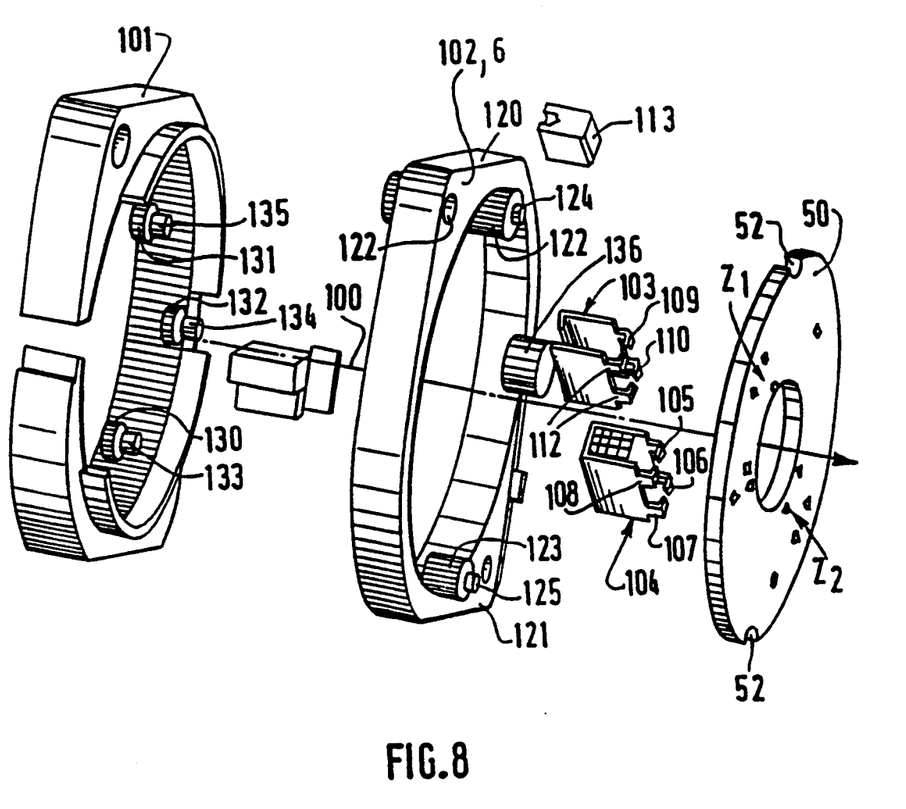
FIG. 8 is an exploded perspective view showing part of a motorised reduction gear unit of a screen wiping apparatus, which employs a machine according to the invention.

With reference now to FIG. 8, this Figure shows an assembly arrangement in another embodiment of the invention. Aligned successively on the axis of rotation 100 are a reduction gearbox base plate 101, an intermediate member 102, and the substrate 50 which has already been described. The brush holder 103 is provided with tongues or lugs 109, 110 and 112, while the other brush holder 104 has similar tongues or lugs 105, 106, 107 and 108. These lugs are arranged to penetrate into the axial through holes formed in the corresponding zones Z1 and Z2 of the substrate 50. Also shown in FIG. 8 is a carbon brush 113 before being installed in the appropriate brush holder 103.

The intermediate member 6 has two fastening ears 120 and 121, in which through holes 122 and 124 are formed for fastening it to the base plate 101 of the reduction gearbox. The intermediate member also includes centring pins 122 and 123. The end of each pin 122 or 123 facing towards the substrate includes a respective one of two locating pegs 124 and 125 which are arranged to engage in the notches 52 and 53 of the substrate 50. Accordingly, the substrate 50 can only be installed in one angular orientation. It will be noted that it comes into abutting engagement on the radial end surface of each centring pin 123 and 125.

The intermediate member 102 also includes three locating pins 130, 131 and 132. The end of each pin 130, 131, 132 facing towards the member 102 carries a respective one of three locating pegs 133, 134 and 135. These pegs engage in corresponding axial recesses (not visible in FIG. 8), which are formed respectively in the centring pins 122 and 123 and in a third centring pin 136. The centring pins 122, 123 and 136 are disposed in the internal bore of the intermediate member 6. The latter is thus located correctly with respect to the base plate 101 of the reduction gearbox.

Figure 9:
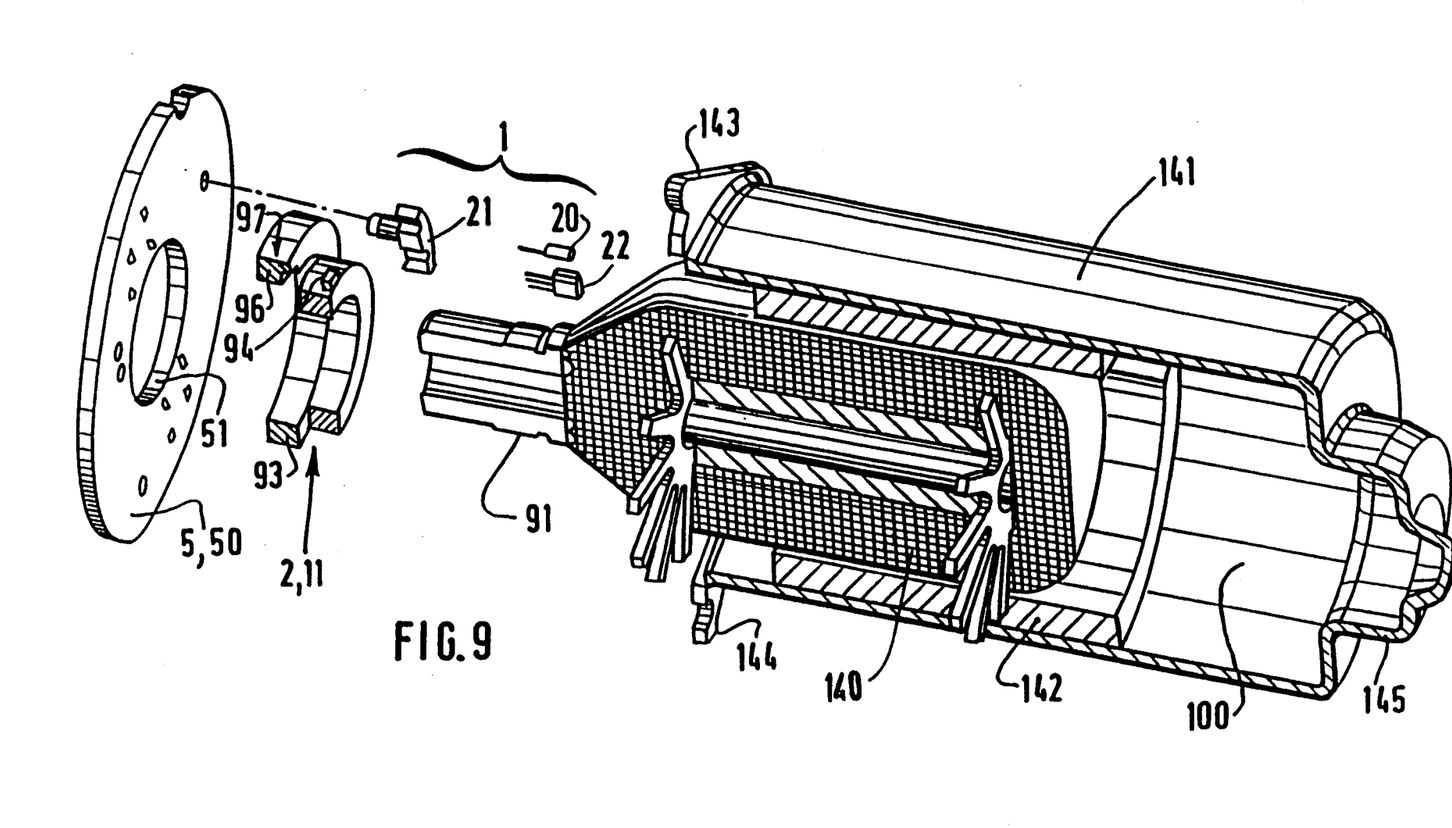
FIG. 9 is another perspective view, shown in partly exploded form and illustrating one embodiment of a machine according to the invention.

With reference now to FIG. 9, this shows, at least in respect of one embodiment of the invention, a continuation of FIG. 8 beyond the right hand side of the latter. The multi-polar wheel 92 is fitted above the substrate 50 coaxially on the axis of rotation 100.

The rotor, which consists mainly of the commutator 90 and the armature 140, is aligned on the axis of rotation 100. The stator of the motor comprises a body or casing 141, which is generally cylindrical in shape and again coaxial on the axis of rotation 100, and which contains permanent field magnets 142 for producing the inductive field of the machine. The casing 141 is formed with fastening ears 143 and 144 which have through holes, the ears with their through holes corresponding with those of the intermediate member 6 and reduction gearbox base plate 101. The casing thus encloses within it all of the other components of the motor. On the axis of rotation 100, the rotor shaft (not shown) is carried by an end thrust bearing (not shown) for the shaft which is fitted in an integral end housing 145 of the casing 141.

The present invention has been described above in a preferred embodiment, by way of example, in relation to a motor having a commutator. However, it is also applicable to motors not having commutators as far as certain of its aspects are concerned, particularly in those relating to the constitution of the printed circuit 5 and its fastening.

Similarly, in the case in which an angular position sensor or reading device 1 is installed, this is not necessarily of the magnetic type. It could also, for example, be of an optical type. Also, a support for an indicating means for angular position of the rotor need not necessarily be especially added. Such a support may be constituted directly by a portion of the rotor in facing relationship with the reading device, once the rotor has been fitted.

Similarly, the invention is also applicable to generators.

What is claimed is:

1. An electro-dynamic machine comprising a casing, windings on the casings, a printed circuit defining conductive zones of the printed circuit, means securing the printed circuit to the casing of the machine, an electrical service circuit carried by the printed circuit, and an electrical connection cable connected on said conductive zones, said service circuit being connected to the windings whereby the latter are connectable to a source of electrical energy or a load via the cable, wherein the machine further includes an intermediate member closing the casing and having a peripheral flange defining a cavity within it, the electrical service circuit being mounted within said cavity, the intermediate member being mounted on the casing with said flange directed towards the exterior of the machine, the machine being associated with drive means such as a reduction gearbox, the drive means having an end plate secured to the casing of the machine with the intermediate member between them, the machine having a rotor with a rotor shaft and a commutator carried by the rotor shaft, the printed circuit including a circular insulating substrate defining a central hole with the rotor shaft and commutator passing through said central hole, the machine further including a brush carrier unit carried by the intermediate member, and the substrate defining on its outer periphery a plurality of locating notches for locating the brush carrier unit, the notches being arranged asymmetrically on the periphery of the substrate whereby the brush carrier unit can only be fitted in one orientation during the fitting of the printed circuit in the motor.

2. An electro-dynamic machine according to claim 1, wherein the intermediate member has fastening lugs, the printed circuit being fastened to the said lugs and the electrical service circuit being formed on the printed circuit.

3. An electro-dynamic machine according to claim 1, further having a commutator, a plurality of fastening elements formed on the printed circuit, brush carriers fastened to the latter by said fastening elements, and carbon brushes each carried by a respective one of the brush carriers and engaging the commutator.

4. An electro-dynamic machine according to claim 1, wherein the substrate defines mounting zones having fastening holes therein, the brush carrier unit having projections inserted into the said holes.

5. An electro-dynamic machine according to claim 1, wherein the casing of the motor has fastening ears, the intermediate member having corresponding ears defining holes, the casing of the motor being secured to the end plate of the drive means by fastening means through the said holes and through the ears of the casing.

6. An electro-dynamic machine according to claim 1, wherein the printed circuit comprises a circular insulating substrate defining on its outer periphery a plurality of locating notches, the intermediate member including centering pins each of which has a first end and a second end, with the latter facing away from the substrate, the first end having an end surface and a respective one of two first locating pegs projecting from said end surface for engaging in said locating notches in the substrate, whereby the substrate can be fitted in a predetermined angular position in abutting engagement on said end surfaces of the centering pins.

7. An electro-dynamic machine according to claim 6, wherein the intermediate member has a central bore, said centering pins being disposed within said central bore, each centering pin defining an axial recess in its said second end, the intermediate member further including a plurality of locating pins each defining an end portion carrying a respective second locating peg, with each said second peg engaged in a respective one of the axial recesses in the centering pins so as to orientate said end plate with respect to the intermediate member.

8. An electro-dynamic machine according to claim 1 and further comprising a reading device carried by the printed circuit for reading an indication of the angular position of the rotor, the machine further including a wheel defining said indication, the machine further having a connecting cable fitted to the printed circuit, and means connecting the reading device electrically to an element comprising at least one of the electrical service circuit and the connecting cable.

9. An electro-dynamic machine according to claim 3, wherein the intermediate member defines at least one recess for affording access to at least one said brush carrier, whereby the respective brush carried by the brush carrier can be replaced without modification to the relative positions of the brushes and the commutator.

* * * * *